Patented Mar. 24, 1936

2,035,361

UNITED STATES PATENT OFFICE 2,035,361

MANUFACTURE OF SULPHURIC ACID ESTERS OF LEUCO DERIVATIVES OF VAT DYESTUFFS

Wilhelm Bauer and Ludwig Zeh, Wiesdorf, and Bernhard Bollweg, Leverkusen-on-the-Rhine, Germany, assignors, by mesne assignments, to Durand & Huguenin A.-G., Basel, Switzerland, a corporation of Switzerland No Drawing. Application July 25, 1931, Serial No. 553,191. In Germany July 30, 1930

5 Claims. (Cl. 260—37)

The present invention relates to a process of preparing stable sulphuric acid esters of leuco derivatives of vat dyestuffs.

In U. S. A. Patent 1,448,251 there is described a process for the manufacture of ester like, water soluble compounds of vat dyestuffs, by causing leuco compounds of the latter to react with sulphur trioxide or agents capable of splitting off sulphur trioxide, in the presence of a tertiary organic base.

In accordance with the present invention the same products are obtained in considerably simpler manner and without isolating the leuco derivatives. The method of working according to our invention is by reducing the vat dyestuffs by means of hydrogen sulphide in the presence of a primary or secondary organic base capable of easily forming salts with hydrogen sulphide, and in the presence of an appropriate tertiary organic base, which may be replaced partially or totally by a suitable organic solvent or diluent inert to the components of the reaction mixture. Esterification is then performed by mixing the reaction mixture obtained as described above in the presence of a tertiary organic base with the addition product of a tertiary organic base with sulphur trioxide or an agent containing free sulphur trioxide or capable of splitting off sulphur trioxide under the working conditions. If desired, the esters thus formed may be converted into water-soluble salts (alkali metal salts or the like) in the usual manner.

The more detailed method of working may be, for example, as follows:—

The dyestuff to be transformed into the stable sulphuric acid ester is suspended in a mixture of a primary or secondary organic base of the type specified and of an appropriate tertiary organic base, such as tertiary aromatic bases, tertiary heterocyclic bases or tertiary hydrogenated isocyclic bases, for example, dimethylaniline, dimethyl-para-toluidine, pyridine or a homologue thereof, quinoline or one of its homologues, hexahydrodimethyl-aniline etc. Hydrogen sulphide is then passed through the mixture at normal or slightly elevated temperatures, say, between about 10 to 50° C., until the conversion of the starting dyestuff into its leuco derivative is complete, i. e., until the original coloration of the dyestuff has disappeared. Lower and higher temperatures than given above will be likewise operable in most cases and are within the scope of our invention.

Suitable primary or secondary organic bases are, for example, aliphatic primary and secondary amines, (butylamine, dibutylamine, ethylamine, dimethylamine, propylamine, ethylmethylamine) secondary heterocyclic bases, such as piperidine or its homologues, tetrahydroquinoline, etc. or hydrogenated isocyclic primary or secondary amines, especially such ones, as are hydrogenated in the nucleus to which the nitrogen atom is attached, such as hexahydroaniline (cyclohexylamine), hydrogenated toluidines, hydrogenated naphthylamines, hydrogenated phenylmethylamine etc.

The tertiary base in the above process may be replaced partly or totally by an organic solvent or diluent inert to the components of the reaction mixture, such as chloro-benzene, ortho-dichlorobenzene, trichlorobenzenes or other halogenated aromatic hydrocarbons, benzene, toluene, xylenes, etc.

The amount of the primary or secondary base to be applied is a rather small one. Generally, ⅕ molecular weight upon 1 molecular weight of the dyestuff to be reduced is operable, but in most cases better results are obtained when applying the base in somewhat larger amounts, say, up to one molecular weight of the base on one molecular weight of the dyestuff to be reduced. Substantially larger amounts are likewise operable but unnecessary and are unfavorable in so far as they would combine with a substantial part of the esterifying agent applied in the esterifying process following the reduction process. The exact amounts yielding the best results will depend to a great extent on the type of the respective dyestuff to be reduced.

The amount of hydrogen sulphide to be used in the reduction process may vary in wide limits. Generally, we prefer to apply it in an amount corresponding to more than one molecular weight upon one molecular weight of the dyestuff to be reduced. Larger amounts are advantageous in many cases.

The reaction mixture obtained as described above containing the dyestuff in the leuco form is mixed with an esterifying agent. As esterifying agents the known addition products of tertiary organic bases with sulphur trioxide or agents containing free sulphur trioxide or capable of splitting off the latter under the conditions of working, such as chlorosulphonic acid, chlorosulphonic acid esters, fuming sulphuric acid, etc. may be applied.

The esterifying agents mentioned are applied in admixture with a tertiary organic base, which may be partially replaced by an organic solvent or diluent inert to the components of the reaction mixture. Suitable tertiary bases and organic solvents are, for example, pyridine, quinoline, or homologues of these compounds, dimethylaniline, dimethyl-para-toluidine, chlorobenzene, dichlorobenzene, trichlorobenzene, etc. The amounts of the esterifying agents to be used may vary in wide limits. Generally, we prefer to apply the same in such an amount that more than two molecular proportions of sulphur trioxide are available on one molecular proportion of the leuco derivative of the vat dyestuff to be esterified. Esterification takes place at low temperatures, but slightly elevated temperatures are likewise operable and tend to accelerate the esterification process. Generally, we prefer to apply temperatures between about 5 to 70° C.

The sulphuric acid esters are thus obtained in form of their salts with a tertiary base. They may be isolated by pouring the reaction mixture into water. In order to transform the salts of the esters thus obtained into water soluble salts, the reaction products may be heated with an alkali, such as aqueous sodium or potassium carbonate solution, whereby the alkali metal salts of the esters are formed. Obviously, the alkali may be added to the reaction mixture without isolating the salt of the ester with the tertiary base, whereby likewise the alkali metal salts of the esters are obtained, which may be isolated by distilling off the tertiary base in vacuo or by steam distillation, dissolving the residue in water, filtering and salting out.

It should be stated that in the reduction and esterification steps of our process the presence of water and oxygen (air) should be avoided as far as technically possible.

The following examples illustrate the invention, without, however, restricting it thereto, the parts being by weight:—

Example 1

290 parts of tetrabromoindigo are reduced in 2000 parts of dimethylaniline after the addition of 10 parts of piperidine by means of hydrogen sulphide gas at a temperature of about 20° C. Then the reaction mass is stirred into an esterifying mixture, obtained at a temperature of —10° to 0° C. from 400 parts of chlorosulphonic acid, 1000 parts of dimethylaniline and 2000 parts of chlorobenzene, and esterified while slowly raising the temperature to 40 to 50° C.

Isolation of the ester salt is performed by stirring the mixture into a solution of 500 parts of calc. soda in 5000 parts of hot water, filtering and washing with hot water, and from the aqueous layer of the filtrate the ester salt is salted out, sucked off and dried. It forms a white crystalline mass.

Example 2

290 parts of tetrabromoindigo are converted into the leuco compound in 2000 parts of chlorobenzene after the addition of 10 parts of piperidine by means of hydrogen sulphide gas. Esterification and isolation of the ester salt is performed as described in Example 1.

Example 3

405 parts of the dyestuff of the formula

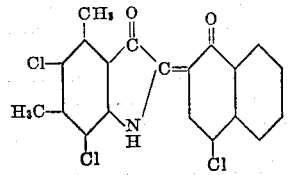

are reduced in 2000 parts of chlorobenzene after the addition of 20 parts of piperidine by means of hydrogen sulphide gas. Heating occurs during this process and the leuco compound separates with a weakly yellow coloration.

Esterification is performed by introducing the mixture into a solution of 580 parts of chlorosulphonic acid, 2000 parts of dimethylaniline and 2,000 parts of chlorobenzene while slowly raising the temperature to 50–60° C. After being stirred for one hour the solution is poured into 2500 parts of caustic soda solution (30%), and the chlorobenzene-dimethylaniline mixture is removed by steam distillation. Air is blown through the remaining liquid in order to oxidize the traces of the unesterified leuco compound. After filtration the ester salt is separated by salting out.

Example 4

393 parts of 5.5'-dichloro-7.7'-dimethyl-thioindigo are distributed in the tenfold quantity of pyridine, and are reduced under the addition of 40 parts of piperidine, first while weakly cooling, then at a temperature of 30 to 40° C., by introducing hydrogen sulphide gas. The leuco compound is esterified in an esterifying mixture consisting of 1600 parts of chlorosulphonic acid and 6400 parts of pyridine, in the usual manner. Thereupon the mixture is stirred into an aqueous solution of 2400 parts of sodium carbonate, and the pyridine is removed by steam distillation. After separation of small amounts of unesterified dyestuff and of sulphur being formed during the reaction, the sodium salt of the acid sulphuric acid ester is salted out with sodium chloride.

Example 5

400 parts of 4-methyl-6-chloro-6'-methoxythioindigo are mixed with 80 parts of dibutylamine and 3000 parts of dimethylaniline, and reduced to the leuco compound by slowly introducing a current of hydrogen sulphide gas at a temperature of about 20 to 30° C. The yellowish paste thus obtained is stirred into an esterifying mixture containing 1000 parts of chlorosulphonic acid, 4000 parts of dimethylaniline and 3000 parts of chlorobenzene, and while slowly raising the temperature to 50–60° C. it is converted into the acid sulphuric acid ester of leuco-4-methyl-6-chloro-6'-methoxythioindigo, which is separated as sodium salt in the usual manner.

Example 6

When replacing the dyestuff of Example 5 by the same quantity of the dyestuff of the formula

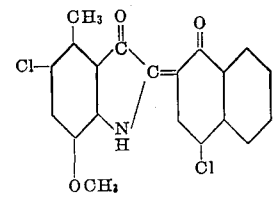

and when using instead of 80 parts of dibutylamine 80 parts of butylamine, the sodium salt of the ester is obtained as yellowish-white to greyish-white crystalline powder.

4.4' - dichlorodianilido - benzoquinone can be esterified in the same manner.

The butylamine can also be replaced by other amines, such as for example, N-methylcyclohexylamine.

Example 7

330 parts of 3.4.8.9-dibenzopyrene-5.10-quinone are mixed with the tenfold quantity of dimethylaniline or dimethyl-para-toluidine. Thereupon 40 parts of cyclohexylamine are added and the mixture is reduced by introducing 60–70 parts of anhydrous hydrogen sulphide gas. The leuco compound thus obtained is esterified by a mixture consisting of 900 parts of chlorosulphonic acid, 3600 parts of dimethylaniline and 3600 parts of chlorobenzene. The sodium salt of the ester is separated according to the known method.

*Example 8*

Into a mixture of 375 parts of the dyestuff of the formula

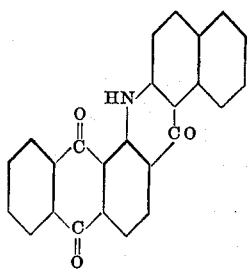

with the sevenfold quantity of anhydrous pyridine and 40 parts of piperidine, 80 parts of hydrogen sulphide are slowly introduced. The yellowish red solution of the leuco compound thus obtained is esterified in the usual manner with a mixture consisting of 1000 parts of chlorosulphonic acid and 3000 parts of pyridine. Thereupon the excess of the pyridine is distilled off in the vacuo and the pyridine salt separated with water; it is sucked off, washed with water and converted into the sodium salt, which can be easily salted out.

*Example 9*

520 parts of dimethoxydibenzanthrone are mixed with 40 parts of piperidine and the tenfold quantity of pyridine and reduced by slowly introducing 80 parts of hydrogen sulphide. The dark red solution of the leuco compound is esterified with a mixture consisting of 1000 parts of chlorosulphonic acid and 3500 parts of pyridine at a temperature of about 10 to 50° C. The reddish brown sodium salt of the ester is separated according to the known method.

Instead of the pyridine dimethylaniline or other tertiary aromatic bases, such as diethylaniline and dimethyl-para-toluidine can be applied, and the sodium salt of the ester can be separated according to the known method.

We claim:—

1. In a process which comprises reducing a vat dyestuff and esterifying the reaction product without isolating it by mixing the reaction mixture with the addition product of a tertiary organic base with a compound of the group consisting of sulphur trioxide, agents containing free sulphur trioxide and agents capable of splitting off sulphur trioxide, esterification being always performed in the presence of a tertiary organic base and the total process being performed under substantially anhydrous conditions and in the absence of oxygen, the improvement which consists in carrying out the reduction of the vat dyestuff with hydrogen sulphide in the presence of a compound of the group consisting of primary and secondary organic bases capable of easily forming salts with hydrogen sulphide and of a tertiary organic base, which may be replaced by an organic solvent inert to the components of the reaction mixture.

2. In a process which comprises reducing a vat dyestuff and esterifying the reaction product without isolating it by mixing the reaction mixture with the addition product of a tertiary aromatic amine with a compound of the group consisting of sulphur trioxide, agents containing free sulphur trioxide and agents capable of splitting off sulphur trioxide, esterification being performed at a temperature between about 5 and about 70° C. in the presence of a tertiary aromatic amine and the total process being performed under substantially anhydrous conditions and in the absence of oxygen, the improvement which consists in carrying out the reduction of the vat dyestuff with hydrogen sulphide in the presence of piperidine and of a tertiary aromatic amine at a temperature between about 10 and about 50° C.

3. In a process which comprises reducing a vat dyestuff and esterifying the leuco derivative formed without isolating it by mixing the reaction mixture with the addition product of dimethylaniline and chlorosulphonic acid, esterification being performed at a temperature between about 5 and about 70° C. in the presence of dimethylaniline, and the total process being performed under substantially anhydrous conditions and in the absence of oxygen, the improvement which consists in carrying out the reduction of the vat dyestuff with hydrogen sulphide in the presence of piperidine and dimethylaniline at a temperature between about 10 and about 50° C.

4. In a process which comprises reducing a vat dyestuff and esterifying the leuco derivative formed without isolating it by mixing the reaction mixture with the addition product of dimethylaniline and a chlorosulphonic acid ester, esterification being performed at a temperature between about 5 and about 70° C. in the presence of dimethylaniline, and the total process being performed under substantially anhydrous conditions and in the absence of oxygen, the improvement which consists in carrying out the reduction of the vat dyestuff with hydrogen sulphide in the presence of piperidine and dimethylaniline at a temperature between about 10 and about 50° C.

5. In a process which comprises reducing a vat dyestuff and esterifying the reaction product without isolating it by mixing the reaction mixture with the addition product of a tertiary aromatic amine with a compound of the group consisting of sulphur trioxide, agents containing free sulphur trioxide and agents capable of splitting off sulphur trioxide, esterification being performed at a temperature between about 5 and about 70° C. in the presence of a tertiary aromatic amine and the total process being performed under substantially anhydrous conditions and in the absence of oxygen, the improvement which consists in carrying out the reduction of the vat dyestuff with hydrogen sulphide in the presence of dibutylamine and a tertiary aromatic amine at a temperature between about 10 and about 50° C.

WILHELM BAUER.
LUDWIG ZEH.
BERNHARD BOLLWEG.